(12) United States Patent
Forsén et al.

(10) Patent No.: US 6,561,126 B2
(45) Date of Patent: May 13, 2003

(54) METHOD AND APPARATUS FOR TEAT CUP CLEANING

(75) Inventors: Gösta Forsén, Tullinge (SE); Epke Bosma, Tumba (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 10/168,124

(22) PCT Filed: Dec. 12, 2000

(86) PCT No.: PCT/SE00/02498

§ 371 (c)(1),
(2), (4) Date: Jun. 14, 2000

(87) PCT Pub. No.: WO01/43534

PCT Pub. Date: Jun. 21, 2001

(65) Prior Publication Data

US 2002/0189546 A1 Dec. 19, 2002

(30) Foreign Application Priority Data

Dec. 15, 1999 (SE) .................................................. 9904593

(51) Int. Cl.⁷ .............................. A01J 3/00; A01J 5/00
(52) U.S. Cl. .................................. 119/14.02; 119/14.08
(58) Field of Search ........................... 119/14.02, 14.08, 119/14.18

(56) References Cited

U.S. PATENT DOCUMENTS

| | | | | | |
|---|---|---|---|---|---|
| 4,175,514 A | * | 11/1979 | Souza et al. | ............. | 119/14.08 |
| 4,572,105 A | * | 2/1986 | Chowdhury et al. | ..... | 119/14.18 |
| 5,896,828 A | * | 4/1999 | Kronschnabel et al. | .. | 119/14.02 |
| 5,960,736 A | * | 10/1999 | Ludington et al. | ....... | 119/14.08 |
| 6,164,242 A | * | 12/2000 | Olofsson | ................. | 119/14.02 |

FOREIGN PATENT DOCUMENTS

| | | | | |
|---|---|---|---|---|
| EP | 0 385 539 A2 | 9/1990 | ............... | 119/14.08 |
| EP | 0 399 604 A1 | 11/1990 | ............... | 119/14.08 |
| WO | WO 98/28969 | 7/1998 | ............... | 119/14.08 |
| WO | WO 99/01024 | 1/1999 | ............... | 119/14.08 |

* cited by examiner

*Primary Examiner*—Charles T. Jordan
*Assistant Examiner*—Elizabeth Shaw
(74) *Attorney, Agent, or Firm*—Hovey Williams LLP

(57) ABSTRACT

The present invention refers to teat cup cleaning in an automated milking system comprising a plurality of teat cups, each connected to a first end of a respective milk line (5), and the second end of each milk line being individually and automatically connectable to a first (7) or a second container (9), respectively, wherein, during milking of the teats of a milking animal, the plurality of teat cups are attached to the teats of the animal, the second ends of the milk lines are connected to said first container and vacuum is supplied to said first container in order to draw milk through the milk lines into said first container. The cleaning comprises supplying (41, 43) a cleaning fluid to at least a first (3) of said plurality of teat cups; connecting the second end of the milk line (5) connected to the first teat cup (3) to said second container (9); and supplying vacuum to said second container in order to suck cleaning fluid through the milk lines into said second container (9), while keeping said first container (7) at substantially atmospheric pressure.

33 Claims, 1 Drawing Sheet

METHOD AND APPARATUS FOR TEAT CUP CLEANING

TECHNICAL FIELD OF THE INVENTION

The present invention generally relates to dairy farm machine milking and to teat cup cleaning related thereto.

Particularly, the invention relates to a method for teat cup cleaning in an automated milking system, and to such an automated milking system.

DESCRIPTION OF RELATED ART AND BACKGROUND OF THE INVENTION

When a milking animal, such as a cow, presents for milking it is important to ensure that the teat cups to be attached to the teats of the milking animal are clean and free of any condition that could contaminate the teats of the milking animal. This need applies to both manual and automatic application of milking apparatus. Therefore, it is customary to wash the teat cups between the milking of each milking animal, either a cleaning liquid or only water is used.

One such teat cup cleaning technique as used by applicant comprises injecting water from below into the teat cups arranged with their respective teat receiving openings faced towards the floor, whereafter the water is allowed to flush back trough the openings and out on the floor. Using such a technique, there is a risk that milk remaining far up in the milk tubes to which the teat cups are attached, after washing, flows down into the teat cups and contaminates the same.

Another prior art teat cup cleaning technique is depicted in U.S. Pat. No. 4,061,504 (CORNELL RESEARCH FOUNDATION) and in the Swedish patent application No. 8600770 (TAURINA) and comprises a forward flush method, wherein the cleaning liquid is injected into the teat cups from a cleaning liquid supply tank and flushed through a major part, including the milk jar, of the milking system and back to the cleaning liquid supply tank in a closed loop. Such a cleaning technique is however not intended to be performed such frequently as between the milking of each milking animal.

Still another prior art teat cup cleaning technique is disclosed in EP 0,385,539, A2 (LELY) and EP 0,510,779, A2 (LELY). Here, a rinse fluid container is connected to teat cups in upright positions, via respective rinse lines and rinse jetters, said jetters being attached to the respective teat cups in a fluid-tight manner, whereafter, due to vacuum, rinse fluid is sucked from the container, through the rinse lines and the jetters and into the teat cups, and further through respective milk lines to respective milk meters. Inside the milk meters, the rinse fluid flows from respective milk receptacles to respective measuring chambers, from where it is pumped (in the same manner as milk during milking) through respective discharge lines, and into a common discharge line. At the end of this common discharge line there is provided a three-way valve for feeding the rinse fluid through a second rinse line and back to the rinse fluid container in its first position and for admitting milk to be fed through a further milk line and to a milk jar loop in its second position.

Drawbacks of this cleaning technique includes that there may be a risk of contaminating collected milk in the milk jar loop if the three-way valve fails. The pumping of the rinse fluid through the common discharge line and the three-way valve gives an over-pressure in the three-way valve, the three-way valve thus being the only component that prevents rinse fluid from leaking into the milk jar loop. Further, the fluid-tight attachment of the jetters and the upright positions of the teat cups limit the discharge of all rinse fluid to be performed through the three-way valve.

WO 96/11568 (MAASLAND) discloses still another cleaning technique, which should be acknowledged, this technique being particularly designed for teat cup cleaning between pre-milking and milking. Three-way valves are arranged in immediate vicinity of respective teat cups, said valves connecting to respective pre-milking lines in their first positions and to respective milking lines in their second positions. No details of the washing principle as such are disclosed.

SUMMARY OF THE INVENTION

Accordingly, it is an object of the present invention to provide a method for teat selective milking and teat cup selective cleaning in an automated milking system, which avoids at least some of the problems associated with prior art systems.

It is in this respect a particular object of the invention to provide such a method that is effective, fast, accurate, reliable, safe, easy to install and perform, and particularly of low cost.

It is yet a further object of the invention to provide the method, which may be implemented by using a minimum of equipment.

These objects among others are, according to one aspect of the invention, attained by a method as claimed in claim 1.

A further object of the present invention is to provide an apparatus for performing the method according to the first aspect of the invention.

In this respect, it is yet a further object of the invention to be integratable in an automated milking system.

Consequently, there is according to a second aspect of the present invention provided an automated milking system as claimed in claim 17.

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given hereinbelow and the accompanying FIG. 1, which is given by way of illustration only, and thus is not limitative of the present invention.

DETAILED DESCRIPTION OF EMBODIMENTS

Figure 1:
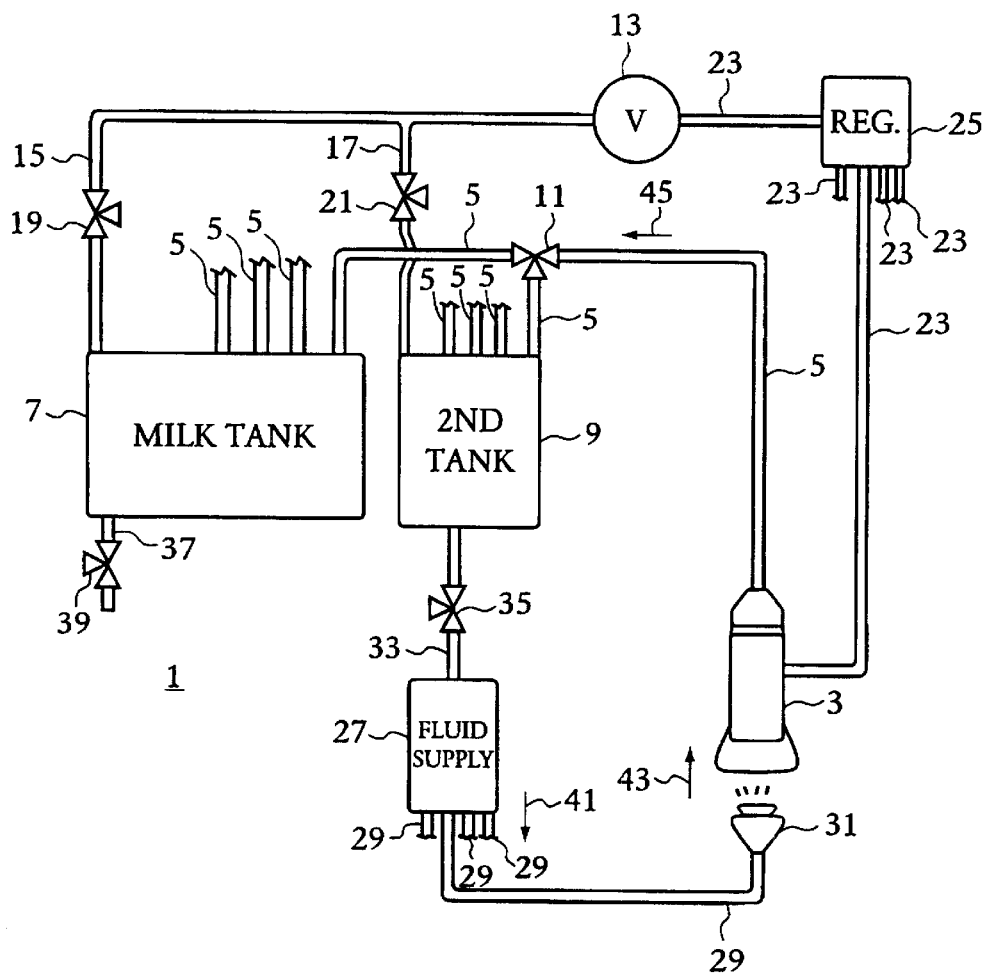
FIG. 1 displays schematically an embodiment of an automated milking system, where the method according to the present invention may be implemented.

In the following description, for purposes of explanation and not limitation, specific details are set fourth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Referring to FIG. 1, a first embodiment of an automated milking system 1 for milking of a milking animal, such as a cow, has four teat cups at its end, of which only one 3 is shown for the sake of simplicity. Each such teat cup 3 may be of any conventional type and is independently of each other connected to a respective milk line 5. Each milk line 5 may independently of each other be connected to either a milk tank 7 or to a second tank or waste receptacle 9 by way of a respective three-way valve 11. In. FIG. 1 is indicated only one three-way valve 11 and one complete milk line 5, but it is appreciated that there are four of them. Portions of three further milk lines 5 are indicated at the two tanks.

Further, both tanks 7 and 9 are independently of each other connected to a vacuum supply source 13 by means of a respective vacuum line 15, 17. Each vacuum line 15, 17 has a respective three-way valve 19, 21 (or other regulation means) for independent supplying of vacuum. The vacuum supply source 13 is also connected to each teat cup 3 via a vacuum line 23 and a regulated pulsator system 25 in a common manner. The fact that there are provided four vacuum lines from pulsator system 25 to each respective teat cup is indicated by portions of three further vacuum lines at pulsator system 25.

The automated milking system comprises a cleaning fluid supply system for the cleaning of each teat cup 3 and milk line 5 (up to three-way valve 11), which cleaning is performed between the milking of each cow, see further discussion below, and for a further more complete cleaning process, which also involves the cleaning of milk tank 7. This latter cleaning process is performed more seldom, such as typically three times a day, as, naturally, milk tank 7 has to be emptied from milk prior to initiating it.

Cleaning fluid supply system comprises a cleaning fluid supply receptacle 27, and, for each teat cup and milk line to be cleaned, a cleaning fluid supply line 29, which ends in an orifice 31, e.g. a nozzle. Further, the second tank 9 may be connected to the cleaning fluid supply receptacle 27 by way of a recirculating or discharge line 33 provided with a valve 35.

Milk tank 7 is also provided with a discharge line 37 and a valve 39. A pump (not shown in the FIGURE) may be provided in discharge line 37 for pumping milk into a further storage unit (not shown in the FIGURE).

Further, there is preferably a respective milk meter, and optionally other sensing or measuring devices (not shown), connected into each milk line 5 for measuring the milk flow, and optionally further parameters, of the milk independently for each teat.

The automated milking system may comprise a number of three-way or shut-off valves, regulators, and any sophisticated automation and control system known in the art. For sake of simplicity such equipment is not shown in the FIGURE.

Each teat cup 3 (not shown in detail) consists in a customary manner of a solid, e.g. metal, sleeve, an inner wall made of a flexible material, e.g. rubber, enclosed thereby, and a rubber cap which seals the space between the sleeve and the inner wall at the upper side. At the lower side, the space between the sleeve and the inner wall is sealed by a sealing ring, while at some distance there above there is provided between the sleeve and the inner wall a ring having an aperture. Between the sealing ring and the ring there is located a space, in which the pulsator system 25 creates through the line 23 a pulsating vacuum, thereby effecting in the space between the sleeve and the inner wall a pulsating vacuum which causes the inner wall to close firmly around the teat, when the teat cup 3 is connected thereto, or causes the inner wall to move outwards again, whereby is obtained the rhythmic movement around the teat as required for the milking operation to be performed.

The milk is thence, by way of constant vacuum supplied to milk line, which is connected to the bottom part of the interior of the inner wall, drawn through line 5 to milk tank 7 (three-way valve in a position which connects teat cup 3 to milk tank 7 and disconnects it from second tank 9 and valve 19 in an opened position such that vacuum supply source 13 communicates with milk tank 7. Such milking may be independently performed for each teat, thus a teat selective milking is performed.

This important in case of mastitis or other illness of a individual teat. If for instance the milk from a particular teat has to be discharged (e.g. as discovered by some automatic measuring and control system) this can readily be performed by the present milking system. The three-way valve 11 for the milk line 5 connected to the particular teat may be positioned in its other position, i.e. disconnecting milk tank 7 and connecting second tank 9. Then, (provided that valve 21 is positioned such that vacuum is supplied to the second tank 9) milk from this particular teat is drawn to the second tank 9, while milk from the other three healthy teats are drawn to milk tank 7. Subsequently, the unwanted milk in the second tank 9 may be discharged through line 33 and valve 35.

Each teat cup is cleaned between the milking of each cow. According to the present invention the teat cup cleaning comprises the following steps (depicted in relation to one teat cup only).

A cleaning fluid is supplied from supply receptacle 27, through supply line 29 and out from orifice 31 (the flow indicated by arrows 41 and 41) into one of the teat cups 3, the milk line 5 that is connected to the teat cup 3 is connected to the second tank 9 by way of three-way valve 11, and vacuum is supplied to second tank 9 in order to suck cleaning fluid through the milk line 5 (flow indicated by arrow 45) into the second container, while the milk tank is kept at a predetermined pressure, preferably atmospheric pressure, which is substantially higher than said vacuum.

By this process it is impossible that cleaning fluid can leak into the milk tank 7 even if the valve 11 fails, since there is a pressure gradient causing any fluid to flow in the opposite direction (i.e. from left to right through valve 11 in the FIGURE).

Preferably, the teat cup 5 is arranged as in the FIGURE, i.e. with its teat receiving opening faced towards the floor. It is also preferred that the teat cup is moved from a milking position to a magazine (not shown) of the milking system. The orifice may be located with distance from the teat cup and provided with means such that the cleaning fluid is ejected into the teat cup, or it may be connected to the teat cup, particularly in a fluid-tight manner.

The supplying of the cleaning fluid may be effected by means of a pump (not shown), which pumps the fluid to the teat cup 5, or the fluid may be sucked into the teat cup, e.g. by supplying vacuum from source 13 to milk line 5 and teat cup 3.

In either case the vacuum is supplied to the second tank, milk line 5 and teat cup 3 subsequent to the supplying of the cleaning fluid. This is preferably done during a predeterimed time in order to dry the interior of the teat cup 3 and the milk line 5.

Portions of the supplied cleaning fluid may during all circumstances be allowed to flush back out of the teat cup 3 and down on the floor (by way of gravity).

The cleaning fluid may be any conventional cleaning fluid or liquid used within the field, or it may be pure water.

After or during cleaning the cleaning fluid collected in the second tank may be discharged through line 33 or may be recirculated through same line and back to supply receptacle 27 by way of positioning valve 35 in appropriate positions.

The automated milking system thus described is simple, effective, accurate, reliable, safe, easy to install and perform, and particularly of low cost. It uses a minimum of equipment using the same discharge line for collecting cleaning fluid and milk of low quality, and it is completely safe with no risk for contaminating the milk collected in the milk tank.

It will be obvious that the invention may be varied in a plurality of ways. Such variations are not to be regarded as a departure from the scope of the invention. All such modifications as would be obvious to one skilled in the art are intended to be included within the scope of the appended claims.

What is claimed is:

1. A method for teat cup cleaning in an automated milking system comprising a plurality of teat cups, each of which is connected to a first end of a respective milk line, and a second end of each milk line is individually and automatically connected to a first or a second container, respectively, wherein, during milking of the teats of a milking animal, the plurality of teat cups are attached to the teats of a milking animal, the plurality of teat cups are attached to the teats of the animal, the second ends of the milk lines are connected to the first container and vacuum is supplied to said first container in order to draw milk through the milk lines into the first container, comprising the steps of:
   supplying a cleaning fluid into at least a first of said plurality of teat cups;
   connecting the second end of the milk line that is connected to the first teat cup to the second container; and
   supplying vacuum to the second container in order to suck cleaning fluid through the milk line connected to the first teat cup into the second container, while
   keeping said first container at a predetermined pressure, which is substantially higher than said vacuum.

2. The method as claimed in claim 1, including supplying the cleaning fluid by supplying said vacuum said vacuum to the second container and thus sucking said fluid from a cleaning fluid supply receptacle through a cleaning fluid supply line and an orifice.

3. The method as claimed in claim 2, including connecting the orifice to the first teat cup in a fluid-tight manner during the supplying of the cleaning fluid.

4. The method as claimed in claim 1, including supplying the cleaning fluid by pumping said fluid from a cleaning fluid supply receptacle through a cleaning fluid supply line and an orifice.

5. The method as claimed in claim 1, including supplying vacuum to the second container and thus to the first teat cup subsequent to the supplying of the cleaning fluid.

6. The method as claimed in claim 5, including supplying vacuum to the second container and thus to the first teat cup during a predetermined time so as to dry said first teat cup and the milk line connected to the first teat cup.

7. The method as claimed in claim 1, wherein the first teat cup has a teat receiving opening and wherein the automated milking system is positioned over a floor, including arranging the first teat cup with its teat receiving opening faced towards the floor during the supplying of the cleaning fluid.

8. The method as claimed in claim 7, including allowing at least a portion of the cleaning fluid to flush back out of the first teat cup and down onto the floor.

9. The method as claimed in claim 1, wherein a liquid or a mixture of liquids is used as said cleaning fluid.

10. The method as claimed in claim 8, wherein water is used as said cleaning fluid.

11. The method as claimed in claim 1, wherein said predetermined pressure, at which the first container is kept, is the atmospheric pressure.

12. The method as claimed in claim 1, including discharging the cleaning fluid from the second container subsequent to the supplying of vacuum to the second container.

13. The method as claimed in claim 1, the automated milking system including a cleaning fluid supply receptacle, and including flowing the cleaning fluid from the second container back to the cleaning fluid receptacle subsequent to or during the supplying of vacuum to the second container.

14. The method as claimed in claim 1, including arranging the first teat cup in a magazine provided in the automatic milking system during the supplying of the cleaning fluid.

15. The method as claimed in claim 1, including supplying a cleaning fluid into at least a second of the plurality of teat cups, and connecting the second end of the milk line that is connected to the second teat cup to the second container.

16. A method for milking comprising a method for teat cup cleaning according to claim 1, further comprising the steps of:
   measuring a quality parameter of milk drawn through a selected one of the milk lines whose first end is connected to one of the plurality of teat cups; and
   in dependence on said measured milk quality parameter disconnecting the second end of the selected milk line form the first container;
   connecting the second end of the selected milk line to the second container; and
   supplying vacuum to the second container in order to suck milk through the selected mil line into the second container.

17. An automated milking system comprising a plurality of teat cups, each of which is connected to a first end of a respective milk line, and the second end of each milk line is individually and automatically connectable to a first or a second container by way of a respective valve means, respectively, wherein, during milking of the teats of a milking animal, the plurality of teat cups are arranged to be attached to the teats of the animal, the second ends of the milk lines are connected to said first container and vacuum is supplied to said first container in order to draw milk through the milk lines into said first container, comprising:
   a cleaning fluid supply system for supplying a cleaning fluid into at least a first of said plurality of teat cups;
   wherein one of the valve means is arranged for connecting the second end of the milk line that is connected to the first teat cup to said second container; and
   vacuum supply means for supplying vacuum to said second container, while said first container is kept at predetermined pressure, which is substantially higher than said vacuum.

18. The system as claimed in claim 17, wherein the vacuum supply means is arranged for supplying said vacuum to said second container and thus sucking said cleaning fluid from a cleaning fluid supply receptacle, through a cleaning fluid supply line and an orifice.

19. The system as claimed in claim 18, wherein the orifice is connected to the first teat cup in a fluid-tight manner during the supplying of the cleaning fluid.

20. The system as claimed in claim 17, wherein the cleaning fluid supply system is arranged for supplying the cleaning fluid by pumping said fluid from a cleaning fluid supply receptacle through a cleaning fluid supply line and an orifice.

21. The system as claimed in claim 20, wherein the orifice is connected to the first teat cup in a fluid-tight manner during the supplying of the cleaning fluid.

22. The system as claimed in claim 17, wherein the vacuum supply means is arranged for supplying vacuum to the second container and thus to the first teat cup subsequent to the supplying of the cleaning fluid.

23. The system as claimed in claim 22, wherein the vacuum supply means is arranged for supplying vacuum to the second container and thus to the first teat cup during a predetermined time so as to dry said first teat cup and the milk line connected to the first teat cup.

24. The system as claimed in claim 17, wherein the system is positioned over a floor and the first teat cup is arranged with its teat receiving opening faced toward the floor during the supplying of the cleaning fluid and in that the system is arranged to allow at least a portion of the cleaning fluid to flush back out of the first teat cup and down on the floor.

25. The system as claimed in claim 17, wherein the cleaning fluid is a liquid or a mixture of liquids.

26. The system as claimed in claim 25, wherein the cleaning fluid is water.

27. The system as claimed in claim 17, wherein said predetermined pressure, at which said first container is kept, is the atmospheric pressure.

28. The system as claimed in claim 17, wherein it is arranged for discharging the cleaning fluid from said second container subsequent to the supplying of vacuum to said second container.

29. The system as claimed in claim 17, wherein it is arranged for flowing the cleaning fluid from said second container back to said cleaning fluid receptacle subsequent to or during the supplying of vacuum to said second container.

30. The system as claimed in claim 17, wherein the first teat cup is arranged in a magazine provided in aid automatic milking system during the supplying of the cleaning fluid.

31. The system as claimed in claim 17, wherein it is arranged for supplying a cleaning fluid into at least a second of said plurality of teat cups, and for connecting, by way of the respective valve means, the second end of the milk line that is connected to the second teat cup to said second container.

32. The system as claimed in claim 17, including a measuring means for measuring a quality parameter of milk drawn through a selected one of the milk lines whose first end is connected to one of the plurality of teat cups; and wherein the system, in dependence on said measured milk quality parameter, further is arranged for disconnecting the second end of said selected milk line from said first container and connecting the second end of said selected milk line to said second container by way of one of the valve means; and the vacuum supply means is arranged for supplying vacuum to said second container in order to suck milk through said selected milk line into said container.

33. The system as claimed in claim 17, wherein each valve means is comprised of a three-way valve.

* * * * *